United States Patent [19]

Clark

[11] Patent Number: 4,916,184
[45] Date of Patent: Apr. 10, 1990

[54] ADHESIVE COMPOSITIONS COMPRISING MALEIC ACID PEROXY COMPOUNDS AS ADHESIVE PROMOTERS

[75] Inventor: Paul J. Clark, West Simsbury, Conn.

[73] Assignee: Loctite Corporation, Newington, Conn.

[21] Appl. No.: 356,167

[22] Filed: May 24, 1989

Related U.S. Application Data

[63] Continuation of Ser. No. 144,894, Jan. 13, 1988, abandoned.

[51] Int. Cl.$^4$ .......................... C08G 63/76; C08F 4/32
[52] U.S. Cl. ..................................... 525/27; 525/262; 525/303; 525/386; 526/232.5; 528/173; 528/364; 523/176
[58] Field of Search ............... 526/232.5; 525/27, 262, 525/303, 386; 528/173, 364; 523/176

[56] References Cited

U.S. PATENT DOCUMENTS

| | | | |
|---|---|---|---|
| 2,757,166 | 7/1956 | Segro et al. | 526/232.5 |
| 4,129,613 | 12/1978 | Lewis et al. | 525/27 |
| 4,370,459 | 1/1983 | Pastorino et al. | 525/27 |
| 4,376,847 | 3/1983 | Matsubara et al. | 526/232.5 |

FOREIGN PATENT DOCUMENTS

| | | | |
|---|---|---|---|
| 61-241313 | 10/1986 | Japan | 525/27 |
| 427957 | 4/1975 | U.S.S.R. | 525/27 |
| 2085464 | 4/1982 | United Kingdom | 525/27 |

OTHER PUBLICATIONS

Official Gazette—1046 TMOG—9/4/84.

Primary Examiner—Joseph L. Schofer
Assistant Examiner—N. Sarofim
Attorney, Agent, or Firm—Edward K. Welch, II; Eugene F. Miller

[57] ABSTRACT

An adhesive composition comprising a component which is polymerizable or cross-linkable with a peroxy initator, e.g., a (meth)acrylic ester monomer, thiolene resin, or tough acrylic copolymer, and an initiator of the formula:

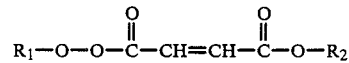

wherein: $R_1$ is H or lower alkyl; and $R_2$ is H or $-OR_3$, where $R_3$ is H or lower alkyl.

An appertaining method of bonding substrates, and bonded articles formed thereby, are also disclosed. The adhesive composition of the invention is particularly advantageous in bonding of metal substrates, on which the maleic acid peroxy compounds of the invention produce surface bonding enhancement of the adhesive composition, relative to the use of conventional polymerization/crosslinking peroxy initiators such as t-butyl perbenzoate.

19 Claims, No Drawings

ADHESIVE COMPOSITIONS COMPRISING MALEIC ACID PEROXY COMPOUNDS AS ADHESIVE PROMOTERS

This is a continuation of co-pending application Ser. No. 144,894 filed on January 13, 1988 now abandoned.

BACKGROUND OF THE INVENTION

1. Field of the Invention

This invention relates generally to adhesive compositions containing adhesion promotor compounds for promoting adhesion of such compositions to metal substrates.

2. Description of the Related Art

In the field of adhesive bonding, a wide variety of adhesive compositions are employed for bonding metal substrates to one another and to other substrate materials. Examples of such adhesive compositions include anaerobic curing adhesives, thiolene compositions, and tough acrylic formulations.

Numerous peroxy-type initiators have been employed with various curable components containing ethylenically unsaturated polymerizable and/or crosslinkable moieties in such adhesive compositions, to initiate or assist in curing thereof.

In compositions in which peroxy-type initiators have been employed, a preferred peroxy-type initiator which has come into widespread usage is t-butyl perbenzoate. The adhesive compositions which have utilized t-butyl perbenzoate and related perbenzoate initiators variously include: anaerobic curing compositions, such as those disclosed in U.S. Pat. No. 3,046,262 to V. K. Krieble; polymerizable compositions based on unsaturated curable poly(alkylene) ether polyol-based resins, as described in U.S. Pat. No. 4,309,526 to L. J. Baccei; and so-called "tough acrylic" formulations comprising acrylic/rubber copolymers capable of being crosslinked through acryloxy and ethylenically unsaturated rubber functional groups, e.g., the tough acrylic composition commercially available under the trademark Depend® (Loctite Corporation, Newington, Connecticut).

In numerous adhesive bonding applications, the aforementioned adhesive compositions utilizing t-butyl perbenzoate are employed for bonding of substrates comprising metal surfaces. In such applications, metal cations on the substrate in conjunction with other accelerators may cause the t-butyl perbenzoate to spontaneously decompose to form benzoic acid and t-butanol. The resulting product benzoic acid, which may be present in concentrations as high as 2-3 percent by weight of the adhesive composition, can then react with the metal cations to form metal-complexed benzoic acid salts.

The benzoic acid and butanol reaction products of the decomposition of the t-butyl perbenzoate initiator are detrimental to the cohesive strength of the adhesive composition and to its adhesion to the substrate. These reaction products function as diluents which do not promote the intended polymerization and/or crosslinking of the ethylenically unsaturated moieties in the composition. Further, the salts of benzoic acid formed at the substrate surface/adhesive composition interface prevent the adhesive composition from achieving good adhesion to the metal surface.

Accordingly, it would be a significant advance in the art to provide a peroxy initiator for use in adhesive compositions such as those illustratively described above, wherein the initiator decomposition products are copolymerizable with the adhesive composition and form copolymerizable metals salts at the interface.

It is therefore an object of the invention to provide a peroxy initiator of such type, which is usefully employed in adhesive compositions to effect polymerization and/or crosslinking thereof, in a manner yielding good adhesion and cohesive strength characteristics for the cured adhesive composition.

Other objects and advantages of the invention will be more fully apparent from the ensuing disclosure and appended claims.

SUMMARY OF THE INVENTION

In one aspect, the invention relates to an adhesive composition, comprising a polymerizable and/or crosslinkable component containing ethylenic unsaturation, and an initiator of the formula:

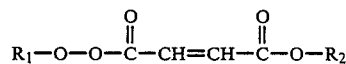

wherein: $R_1$ is H or lower alkyl; and $R_2$ is H or $-OR_3$, where $R_3$ is H or lower alkyl.

In a preferred aspect of the composition broadly described above, at least one of $R_1$ and $R_3$ is lower alkyl; most preferably, $R_1$ is t-butyl and $R_2$ is H.

In another preferred aspect, the polymerizable and/or crosslinkable component containing ethylenic unsaturation is selected from the group consisting of (i) thiolenes, (ii) (meth)acrylic esters, and (iii) copolymers including elastomeric repeating units and non-elastomeric repeating units, and comprising crosslinkable ethylenically unsaturated moieties.

In another aspect, the invention relates to a method of bonding matable surfaces to one another, wherein at least one of the matable surfaces is a metal surface, comprising applying the aforementioned adhesive composition to at least one of the matable surfaces, mating such surfaces in bonding relationship to one another, and curing such composition.

A still further aspect of the invention relates to a bonded assembly comprising matable surfaces at least one of which is a metal surface, bonded to one another by a cured adhesive composition of the type described hereinabove.

Other aspects and features of the invention will be more fully apparent from the ensuing disclosure and appended claims.

DETAILED DESCRIPTION OF THE INVENTION, AND PREFERRED EMBODIMENTS THEREOF.

The present invention is based on the surprising and unexpected discovery that t-butyl peroxy maleic acid and/or various other maleic acid peroxy compounds may be employed in a wide variety of adhesive compositions in which tert-butyl perbenzoate has previously been conventionally employed as an initiator, for applications involving bonding of metal surfaces, to yield striking improvements in adhesion characteristics, relative to corresponding formulations containing tert-butyl perbenzoate or other perbenzoate peroxy initiators.

The initiators of the present invention include compounds of the formula:

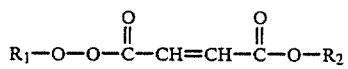

wherein: $R_1$ is H or lower alkyl; and $R_2$ is H or $-OR_3$, where $R_3$ is H or lower alkyl.

As used herein, the term "lower alkyl" refers to alkyl radicals, straight-chained or branched, having from 1 to 8 carbons, optionally substituted with any substituents which do not preclude the efficacy of the associated compound for its intended purpose, viz., as an initiator for the polymerization and/or crosslinking of the polymerizable and/or crosslinkable component ethylenic unsaturation in the adhesive composition.

Preferably, $R_1$ in the above formula, in the case of maleic acid peroxyester compounds, is t-butyl and $R_2$ is H. As indicated, $R_2$ may also be $-OR_3$, where $R_3$ is H or lower alkyl, as may be necessary or desirable in the specific adhesive composition in which the maleic acid peroxy compound is employed. In general, it will be preferred to employ $R_1$ as a branched lower alkyl moiety in peroxyester initiator compounds of the present invention.

Thus, within the broad scope of the present invention, the maleic acid peroxy compounds include: hydroperoxides such as hydroperoxy maleic acid and hydroperoxy maleic acid esters; and peroxyesters including maleic acid peroxyesters and maleic acid ester peroxyesters.

The maleic acid peroxy compounds of the present invention overcome the difficulties associated with the use of the conventionally employed t-butyl perbenzoate initiator in adhesive compositions, viz., the tendency of such perbenzoate compound to decompose at the interface between a metallic substrate and the adhesive composition, to form non-polymerizable benzoic acid metal salts which adversely affect the cohesion and adhesion characteristics of the finally cured composition.

In use, the maleic acid peroxy compounds of the invention decompose to form carboxylate anions which form associative bonds with the metal cations on the surface of the metal substrate. By virtue of the ethylenic unsaturation present in the metal salt formed, they are copolymerizable with the adhesive composition. As a result, adhesion is strikingly increased, without any countervailing formation of non-polymerizable salts or other adhesion/cohesion-diminishing species being formed. The metal/acid salts formed from the maleic acid peroxy compounds thus enhance the adhesion of the composition forming same, as opposed to the detrimental salts formed from t-butyl perbenzoate and similar perbenzoate species.

Although the adhesive function of the maleic acid salts involving metal cations at the adhesive composition/metal substrate interface has been described above as an associative phenomenon, it will be appreciated that the maleic acid and ester carboxylate anions may form metal chelates or other chemically reacted or covalently bonded moieties at the substrate surface, and accordingly the term "associative" is intended to be broadly construed to include all such species and mechanisms. Accordingly, we do not wish to be bound by any theory or hypothesis as regards the specific identity of the species or mechanisms operative at the adhesive composition/substrate interface, with respect to the scope and utility of the present invention.

Further, it will be appreciated that the ethylenic unsaturation in the maleic acid peroxy initiators of the present invention render such compounds copolymerizable with the ethylenically unsaturated monomer(s) or other polymerizable and/or crosslinkable constituents of the adhesive composition, thereby further improving the adhesion/cohesion characteristics of the adhesive composition containing same.

The maleic acid peroxy compounds of the present invention are potentially useful in any adhesive compositions in which t-butyl perbenzoate or other perbenzoate compounds have heretofore been employed as initiators, for carrying out polymerization of polymerizable ethylenically unsaturated monomers or other polymerizable components, and/or crosslinking of peroxy initiated crosslinkable components therein.

Specific polymerizable ethylenically unsaturated monomers which may be potentially usefully employed in the broad practice of the present invention comprise anaerobic curing acrylic monomers, including systems which are self-curable as well as those employing activator and/or promoter species to effect curing thereof; thiolene resin systems comprising comonomer blends of mercaptan and ene compounds; and copolymers such as butadiene-styrene, acrylonitrilebutadiene-styrene, and other copolymers based on elastomeric comonomers and ethylenically unsaturated comonomers, which contain a vinyl or other crosslinkable functionality after being copolymerized. Useful monomers may also include vinyl monomers generally, and unsaturated polyesters solubilized in vinyl monomers.

As used herein, the term "(meth)acrylic" is intended to be broadly construed to include acrylic as well as methacrylic compounds, e.g., acrylic esters and methacrylic esters.

Useful acrylic resins include esters and amides of (meth)acrylic acid as well as comonomers thereof with other copolymerizable monomers. Illustrative esters include methyl acrylate, methyl methacrylate, hydroxy ethyl acrylate, butyl methacrylate, octyl acrylate, and 2-ethoxy ethyl acrylate. Illustrative amides include butoxymethyl acrylamide, methacrylamide, and tert-butyl acrylamide. Also suitable are copolymers of such compounds, and copolymers with other monomers containing polymerizable vinyl groups. Polyacrylates are generally useful, including 1,3-butylene glycol diacrylate, diethylene glycol diacrylate, 1,6-hexanediol diacrylate, neopentyl glycol diacrylate, polyethylene glycol diacrylate, tertaethylene glycol diacrylate, triethylene glycol diacrylate, diacrylate, pentaerythritol tetraacrylate, tripropylene glycol diacrylate, ethoxylated bisphenol-A-diacrylate, trimethylolpropane triacrylate, di-trimethylolpropane tetraacrylate, dipentaerythritol pentaacrylate, pentaerythritol triacrylate, and the correponding methacrylate compounds. Also useful are reaction products of (meth)acrylic acid and epoxide resins, and urethane acrylic resins. Suitable poly(meth)acrylate ester compounds are also described in U.S. Pat. Nos. 4,051,195; 2,895,950; and 3,218,305.

Suitable diacrylate and dimethacrylate monomers for employment in the compositions of the present invention are described in U.S. Pat. No. 3,043,830 (Krieble), U.S. Pat. No. 3,457,212 (Fukuoka et al.), U.S. Pat. No. 3,923,737 (George et al.), and U.S. Pat. No. 3,944,521 (Bradley et al.), incorporated herein by reference. Other suitable polymerizable monomers include acrylate-terminated monomers such as the polyacrylate esters formed from organic polyisocyanates, such monomers being described, for example, in U.S. Pat. No. 3,425,988

(Gorman et al.), and U.S. Pat. Nos. 4,018,351 (Baccei), 4,295,909 (Baccei), 4,309,526 (Baccei), and 4,380,613 (Nativi), all incorporated herein by reference.

Particularly preferred polyfunctional acrylates and methacrylates include triethyleneglycol dimethacrylate, ethyleneglycol dimethacrylate, tetraethyleneglycol dimethacrylate, polyethyleneglycol diacrylate, polyethyleneglycol dimethacrylate, 1,3-butyleneglycol dimethacrylate, trimethylolpropane trimethacrylate, neopentylglycol dimethacrylate, ethoxylated bisphenol A dimethacrylate, propoxylated bisphenol C dimethacrylate and bisphenol A bis (2-hydroxypropyl)dimethacrylate.

Other monoacrylates and monomethylacrylates suitable for employment in the compositions of the present invention as the polymerizable monomer include cyclohexyl methacrylate, 2-ethylhexyl methacrylate, hydroxyethyl methacrylate, isooctyl acrylates and n-butyl acrylate.

Methacrylic acid, acrylic acid, and similar alpha, beta-unsaturated carboxylic acids are also suitable for employment as polymerizable monomers in the adhesive compositions of the present invention, as are half-esters such as those described in U.S. Pat. No. 3,428,614 (Brownstein) and U.S. Pat. No. 4,080,238 (Wolinski et al.), incorporated herein by reference.

Poly(meth)acrylate functional reaction products of the aforementioned half-esters are also useful, such as those described in U.S. Pat. No. 4,209,604 (Weber), incorporated herein by reference.

Still other suitable monomers include the (meth)acrylate functional phosphorous containing monomers described in U.S. Pat. Nos. 4,044,044 (Saito), 4,259,117 (Yamauchi et al.), 4,434,278 (Skiscim) and 4,442,239 (Tsunekawa).

Acrylic and methacrylic functional silanes, siloxanes and silicones are yet another class of polymerizable monomers useful in the inventive compositions. Silicones of such type are disclosed in U.S. Pat. Nos. 2,793,223; 2,893,361; 2,922,806; 2,956,044; 3,878,263; 4,035,355; and 4,348,454, all incorporated herein by reference, and in copending application Ser. Nos. 623,759 now U.S. Pat. No. 4,575,546 (Nakos et al.), 623,760 now U.S. Pat. No. 4,575,545 (Klemarczyk, et al.) and 623,791 now abandoned (Lin), filed June 22, 1984, all incorporated herein by reference.

It will be understood that the foregoing listings of (meth)acrylic compounds are intended only to be illustrative in character, and that any other resin compounds having (meth)acrylic functionality in their molecules may be potentially employed.

Among the foregoing compounds, (meth)acrylic acid esters are preferred, with the most preferred compounds being (meth)acrylic acid esters of polyhydric alcohols, such as ethoxylated trimethylolpropane triacrylate and dipentaerythritol monohydroxy pentaacrylate.

Another class of resins potentially suitable for use in the compositions of the invention includes vinyl monomers such as styrene, vinyl toluene, vinyl pyrrolidone, vinyl acetate, divinyl benzene, and the like.

A further class of potentially useful resin materials comprises unsaturated polyesters, solubilized in vinyl monomers, as ordinarily prepared from alpha-beta ethylenically unsaturated polycarboxylic acids and polyhydric alcohols, as described for example in U.S. Pat. No. 4,025,407.

Various potentially useful thiolene resin systems are disclosed in U.S. Pat. No. 3,784,524, relating to urethane/thioether-containing polyene compositions, and U.S. Pat. No. 3,787,303, directed to radiation curable polyenepolythiol coating compositions, the disclosures of which are hereby incorporated by reference. Other thiolene systems involving the free-radical addition of the thiol to an olefin (such term being understood to include allylic compounds) and potentially useful in the broad practice of the present invention in combination with the maleic acid peroxy compounds previously described, include the thiolene systems disclosed in "Photopolymerization of Surface Coatings" by C. G. Roffey, John Wiley & Sons, Ltd., 1982, at pages 157 et seq.

A preferred class of olefins useful in the aforementioned thiolene systems are allyl functional bisphenol A resins. A particularly preferred olefin in such systems is 3,9-divinyl-2,4,8,10-tetraoxaspiro [5,5] undecane. A particularly preferred mercaptan, useful therewith, is pentaerythritol tetra(3-mercaptopropionate).

Further polymerizable systems potentially useful in connection with the maleic acid peroxy compounds of the invention include so-called "tough acrylic" adhesive compositions, which are based on acrylic resins in combination with rubber monomers or polymers, and are cured with peroxide polymerization initiators. In the resulting products, the rubber component provides soft micro-domains while the acrylic component imparts good physical properties to the composition such as tensile shear strength, impact resistance, and the like.

Examples of tough acrylic compositions include those described in Japanese patent publication Kokai No. 53/84033, published July 25, 1978, disclosing a room temperature-curable coating composition comprising polybutadiene, neopentyl glycol dimethacrylate, and cobalt naphthenate; Japanese patent publication Kokai No. 50/129650 published October 14, 1975, disclosing a polymeric safety glass-forming composition of isoprene-styrene block copolymer, 1,2-polybutadiene, methyl methacrylate, and benzoin methyl ether, which after being mixed and pressed between glass plates is crosslinked by uv radiation; Japanese patent publication Kokai No. 49/88935, disclosing resin compositions comprising polybutadiene and/or polybutadiene with hydroxy, acryloyloxy, carboxy, or epoxy functionalities, $C_8$–$C_{18}$ alkyl (meth)acrylate, filler, organic peroxide, accelerator, and a polymerization inhibitor, the cured product being useful as an electrical insulator. See also Japanese patent publication Kokai No. 58/145716 published August 30, 1983 (thermoplastic graft polymer composition comprising a vinyl polymer containing a radically cross-linkable elastomer and a methacrylate as the main monomer constituents in the presence of an organic peroxide); German Offenlegungsschrift No. 2,403,639 published August 14, 1974 (hardenable flameproof compositions comprising polybutadiene, halophenyl acrylate derivative, and organic peroxide); Japanese patent publication Kokai No. 48/12846 published February 17, 1973 (1,2-polybutadiene grafted with styrene (and optionally glycidyl methacrylate) or chlorostyrene cross-linked with styrene or methyl methacrylate in the presence of a peroxide catalyst); Japanese patent publication Kokai No. 48/1084 published January 9, 1973 (1,2-polybutadiene graft copolymerized with 5–25 mole percent (based on vinyl groups of the butadiene polymer) styrene, the resulting graft copolymer being mixed with styrene or methyl methacrylate and a peroxide); and West German Offenlegungsschrift No. 2,157,884 published July 6, 1972 (butadiene-styrene graft polymer, styrene, and tert-butyl perbenzoate mixed to form a molding composition).

Another commercially available tough acrylic composition which may be advantageously employed with a peroxy initiator according to the present invention is based on a cured mixture of methyl methacrylate and Hypalon ® synthetic rubber made from chlorosulfonated polyethylene (E. I. Dupont DeNemours & Co., Inc., Wilmington, Delaware), commercialized as Depend ® tough acrylic (Loctite Corporation, Newington, Connecticut).

It will be appreciated that the amounts of the maleic acid peroxy compounds which are employed in adhesive compositions according to the present invention may be varied widely depending on the polymerizable and/or crosslinkable components therein and the specific formulation employed, as well as the particular metal substrate to which the adhesive composition is to be applied. In general, however, it will be satisfactory to employ initiatingly effective amounts of peroxy maleic acid and/or maleic acid peroxyester compounds which range from about 0.1 percent to about 20 percent by weight, based on the weight of the polymerizable and/or crosslinkable components, e.g., polymerizable ethylenically unsaturated monomer(s) in the composition, more preferably from about 0.5 to about 10 percent by weight, and most preferably from about 0.5 to about 4% by weight, on the same basis. It will be appreciated that the specific amount of initiatingly effective maleic acid peroxy compound can be readily determined without undue experimentation by the expedient of a few simple tensile shear strength tests, such as may be carried out in accordance with the tensile shear strength test determination method of ASTM D1002, or by simple fixturing tests, or other readily made determinations indicating initiator efficacy.

Depending on the specific polymerizable and/or crosslinkable component(s) employed in the formulation comprising the maleic acid peroxy compound(s) of the invention, it may be necessary or desirable to utilize in addition to the initiator various accelerators or promoters for the polymerization and/or crosslinking reaction(s). In the case of acrylic monomers, for example, accelerators may be employed which include various imides and/or formamide, as disclosed in U.S. Pat. No. 3,046,262 to V. K. Krieble; the accelerator compounds disclosed in U.S. Pat. No. 4,513,127 to A. F. Jacobine; and the saccharin derivatives disclosed in U.S. Pat. No. 4,764,239 to A. F. Jacobine, et al. In general, organic sulfimides are a preferred class of accelerator compounds for acrylic monomer compositions, with benzoic sulfimide being generally usefully employed as an accelerator.

In addition to the foregoing, compositions of the present invention may utilize any other additives and ingredients which are advantageously employed in the specific end use application contemplated. Illustrative of such further additives are fillers, pigments, antioxidants, stabilizers, preservatives, polymerization inhibitors, surfactants, other adhesion promoters, etc.

The substrates which may be bonded with the adhesive compositions of the present invention include any of a variety of substrates including bonding surfaces which are metallic. As used herein, the term "metal surface" and "metallic surface" are intended to be broadly construed to include surfaces formed of metal as well as those which are formed by coating or plating of metal on otherwise non-metallic substrates. Examples of metallized surfaces include polymeric substrates, such as for example polysulfone, polyimide, polypropylene, etc., coated with a film or other layer of a metal, such as nickel, silver, palladium, platinum, copper, etc., or mixtures or alloys of such metal species. Further, metal surfaces may be used as bonding surfaces, in combination with surfaces of other materials, e.g., rubbers, glasses, plastics, wood, leather, etc., to be bonded thereto.

It will be recognized that the substantial improvement in adhesion obtainable with the adhesive compositions of the present invention may in some instances obviate the need for surface preparation of metal surfaces to be bonded, such as would otherwise be required to minimize the deleterious effects of t-butyl perbenzoate or other perbenzoate initiators used in prior conventional practice.

In use, the adhesive composition of the present invention may be applied to at least one of the surfaces of the substrate elements to be bonded to one another, following which the surfaces of the respective substrate elements are mated in bondable relationship to one another, and the composition is cured by polymerization, such as may be commenced by subjecting the mated substrate elements to elevated temperature conditions, or other curing conditions effective to cause the polymerization to take place. In the case of anaerobic curing (meth)acrylate, the mating of the respective substrate elements in bondable relationship to one another causes anaerobic conditions to be achieved between the mated substrate surfaces which in turn causes polymerization to commence, such as in the case of a mated nut and bolt which are to be threadlocked.

A particularly preferred application of the adhesive compositions of the present invention is fixturing of substrates with anaerobic curing adhesive compositions, of a type which rapidly fixture in a short period of time, e.g., less than one minute at ambient temperature conditions.

Illustrative applications areas for the compositions of the present invention include magnet bonding and joining of structural steel surfaces in the automotive, aerospace, and appliance industries, consumer bonding of metal articles for repair and assembly purposes, and the like.

The features and advantages of the invention are more fully shown with reference to the following examples, wherein all parts and percentages are by weight, unless otherwise expressly stated.

EXAMPLE I

In this example a base formulation for an anaerobically curing acrylic resin system was made up, of the composition set forth in Table I below.

TABLE I

| Component | Concentration, grams |
|---|---|
| Polyether glycol urethanemethacrylate block resin, in diluent containing isobornyl acrylate, hydroxypropylmethacrylate, and hydroxyethylmethacrylate (SS-111, Loctite Corporation, Newington, Connecticut) | 437.2 |
| Hydroxyethylmethacrylate | 22.0 |
| Polyethylene glycol dimeth- | 0.95 |

TABLE I-continued

| Component | Concentration, grams |
|---|---|
| acrylate | |
| Quinone | 0.05 |
| 1-Hydroxyethane-1,1-diphosphonic acid | 0.17 |
| Deionized water | 1.16 |
| Methanol | 3.67 |

Utilizing the above base formulation, four comparative samples, Samples 1–4, were made up. Sample 1 utilized as the initiator t-butyl perbenzoate (TBP). Sample 2 had the same composition as Sample 1, except that the initiator was t-butyl peroxy maleic acid (PMA), in accordance with the present invention. Sample 3 had the same composition as Sample 1, with saccharin added thereto as a polymerization accelerator. Sample 4 had the same composition as Sample 2, with saccharin also being added as a polymerization accelerator. The initiators were added in each sample at a concentration of 3.2 percent by weight, based on the total weight of the composition, and saccharin was added in each of Samples 3 and 4 at a concentration of 1.1 percent by weight, based on the total weight of the composition.

Each of the Samples 1–4 was applied to a respective separate one of a pair of 1-inch by 4-inch steel lapshear specimens. The lapshear specimens previously had been hot dipped to provide a galvanized zinc coating thereon, which had then been chromated to passivate the surface. Prior to use in this experiment, the chromate surface coatings on the respective lapshear specimens were removed by polishing with alumina abrasive paste, and the lapshear specimens were then ultrasonically cleaned in acetone. After cleaning, the lapshear specimens were primed with a phosphate monomer mixture (1 percent methacryloxy ethyl phosphate monomer).

The adhesive-applied lapshears were then placed in bonding relationship to the complementary surfaces of the other lapshear in the respective pairs, by pressing the corresponding lapshears together with the adhesive composition therebetween, following which curing of the composition took place at 250° F. for 2 hours.

Similar comparative tests of the adhesive compositions of Samples 1–4 were repeated on various other lapshear metal substrates, including: (i) unprimed, but polished, hot-dipped, zinc galvanized steel lapshears; (ii) steel, primed with the previously described phosphate monomer composition; (iii) unprimed steel; (iv) aluminum primed with the previously described phosphate monomer composition; and (v) unprimed aluminum.

Tensile shear strength values were then determined for the various lapshear specimens, in accordance with the tensile shear strenth determination method of ASTM D1002, yielding the data set forth in Table II below.

TABLE II

EVALUATION OF THE EFFECTS OF PEROXIDES WITH AND WITHOUT SACCHARIN ON ADHESION TO SEVERAL SUBSTRATES
PROCEDURE ASTM NO. D1002 TENSILE SHEAR STRENGTHS (psi)

| Sample | Primed and Polished Galvanized Steel | Unprimed Polished Galvanized Steel | Primed Steel | Unprimed Steel | Primed Aluminum | Unprimed Aluminum |
|---|---|---|---|---|---|---|
| 1 | 1400 | 260 | 1500 | 1100 | 2400 | 190 |
| 2 | 2400 | 400 | 2200 | 1700 | 3400 | 800 |
| 3 | 600 | 150 | 1200 | 1400 | 2300 | 1200 |
| 4 | 1600 | 640 | 2300 | 1600 | 3500 | 1300 |

A comparison of the tensile shear strength values for the specimens bonded with the Sample 1 and Sample 2 compositions (Sample 1 using t-butyl perbenzoate as an initiator, and Sample 2 utilizing t-butyl peroxy maleic acid) shows that for each substrate system, the use of the maleic acid peroxyester initiator in accordance with the present invention provided a striking and unexpected improvement in tensile shear strength, relative to the corresponding formulation utilizing t-butyl perbenzoate. For example, in the case of unprimed aluminum, the use of the maleic acid peroxyester initiator in accordance with the present invention resulted in more than a four-fold increase in tensile shear strength, as compared to the corresponding composition containing t-butyl perbenzoate.

The same trend of surprising and striking improvement is evidenced by the various lapshear specimens utilizing the formulations of Samples 3 and 4, in which a saccharin (benzoic sulfimide) accelerator was employed. For example, in the respective tests on primed and unprimed hot-dipped zinc galvanized steel lapshears, the use of t-butyl peroxy maleic acid in place of t-butyl perbenzoate provided an increase in tensile shear strength of greater than 2.5 times that achieved for the t-butyl perbenzoate-containing formulations.

The foregoing data thus show the surprising and unexpected character of enhancement in tensile shear strength which is obtained by utilizing t-butyl peroxy maleic acid in accordance with the present invention, relative to corresponding formulations utilizing t-butyl perbenzoate.

EXAMPLE II

In this experiment, a base formulation was made up of the composition set forth in Table III below.

TABLE III

| Component | Concentration, ppH |
|---|---|
| Ethoxylated-bis-phenol-A-bis-(norborn-2-ene-5-carboxylate | 70 |
| Pentaerythritol tetra-(3-mercapto-propionate) | 28 |
| Initiator | 2 |

Separate samples according to the above formulation were made up, one of which utilized t-butyl peroxybenzoate as the initiator (Sample 5) and the other of which employed peroxy maleic acid as the initiator, in place of t-butyl peroxybenzoate (Sample 6).

The respective formulations of Samples 5 and 6 were applied to lapshear test specimens of steel, and galvanized steel. Zero gap and ten mil gap lapshear specimen systems were employed, and tensile shear strength was determined in accordance with the method of ASTM D1002. The results of these tests are set forth in Table IV below, wherein the initiator is indicated as PMA (peroxy maleic acid) or TBP (t-butyl peroxybenzoate), as applicable. The gap for each lapshear test system is indicated, together with the tensile shear strength in psi and the standard deviation of the tensile shear strength value.

TABLE IV

| Substrate | Initiator | Gap | Tensile Shear Strength, psi | Standard Deviation |
|---|---|---|---|---|
| Steel* | TBP | 0 | 2836 | 429 |
| Steel* | PMA | 0 | 3149 | 91 |
| Steel* | TBP | 10 mil | 1334 | 334 |
| Steel* | PMA | 10 mil | 3101 | 288 |
| Galvanized | TBP | 0 | 684 | 290 |
| Galvanized | PMA | 0 | 1578 | 231 |
| Galvanized | TBP | 10 mil | 440 | 61 |
| Galvanized | PMA | 10 mil | 2811 | 88 |

*ungalvanized

In each test system above, the formulation was applied to the lapshear test specimens and cured at 250° F. for 2 hours.

The foregoing data show that the use of peroxy maleic acid as an initiator species produced a substantially greater tensile shear strength value in each test system, as compared to the corresponding test samples wherein the adhesive composition utilized t-butyl peroxy benzoate.

While the invention has been illustratively described with reference to specific embodiments thereof, it will be appreciated that numerous variations, modifications, and embodiments are possible, and accordingly all such variations, modifications, and embodiments are to be regarded as being within the spirit and scope of the invention.

What is claimed is:

1. A curable adhesive composition comprising (i) a crosslinkable component containing ethylenic unsaturation and (ii) from about 0.1 to about 10 percent by weight, based on the combined weight of (i) and (ii) of an initiator of the formula:

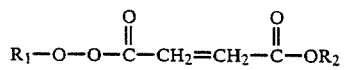

wherein $R_1$ is H or lower alkyl and $R_2$ is H or $-OR_3$, where $R_3$ is H or lower alkyl.

2. An adhesive composition comprising an anaerobically curable ethylenically unsaturated monomer, and a polymerization initiator for said monomer, of the formula:

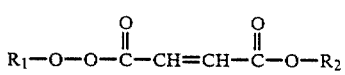

wherein: $R_1$ is H or lower alkyl; and $R_2$ is H or $-OR_3$, where $R_3$ is H or lower alkyl.

3. A bonded article comprising surfaces bonded to one another with a cured adhesive composition formed by curing of the adhesive composition of claim 1.

4. A bonded article according to claim 3, wherein said initiator is t-butyl peroxy maleic acid.

5. A bonded article according to claim 4, comprising in the cured adhesive composition a polymerized (meth)acrylic ester.

6. The curable adhesive composition of claim 1 wherein the crosslinkable component is selected from the group consisting of
   (a) (meth)acrylic esters;
   (b) thiolene systems;
   (c) copolymer systems including elastomeric repeating units and non-elastomeric repeating units and comprising crosslinkable ethylenically unsaturated moieties; and
   (d) unsaturated polyesters.

7. The curable adhesive composition of claim 6 wherein the crosslinkable component is a (meth)acrylic ester selected from the group consisting of
   (a) (meth)acrylate monomers;
   (b) (meth)acrylic functional polymers; and
   (c) blends of (a) or (b) with rubber monomer or polymers.

8. The curable adhesive composition of claim 1 wherein the initiator (i) is employed in an amount of the about 0.5 to about 4 percent by weight based on the combined weight of (i) and (ii).

9. The curable adhesive composition of claim 1 wherein $R_1$ is lower alkyl and $R_2$ is H.

10. The curable adhesive composition of claim 9 wherein $R_1$ is t-butyl.

11. The curable adhesive composition of claim 1 wherein $R_1$ is H and $R_2$ is lower alkoxy.

12. An improved adhesive composition comprising (i) a curable component containing ethylenic unsaturation and (ii) an effective amount of an initiator therefor wherein the improvement comprises employing as the initiator (ii) a compound of the formula

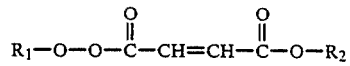

wherein $R_1$ is H or lower alkyl and $R_2$ is H or $-OR_3$, wherein $R_3$ is H or lower alkyl for enhanced adhesion of the cured adhesive composition to metal substrates.

13. The improved composition of claim 12 wherein the initiator is employed in an amount of from about 0.5 to about 10 percent by weight based on the combined weight of the curable component (i) and the initiator (ii).

14. The improved composition of claim 12 wherein the initiator is employed in an amount of from about 0.5 to about 4 percent by weight based on the combined weight of the curable component (i) and the initiator (ii).

15. The improved composition of claim 12 wherein $R_1$ is lower alkyl and $R_2$ is H.

16. The improved composition of claim 15 wherein $R_2$ is t-butyl.

17. The improved composition of claim 12 wherein the curable component (ii) is selected from the group consisting of
   (a) crosslinkable (meth)acrylic esters;
   (b) thiolene resin systems;
   (c) copolymer systems including elastomeric repeating units and non-elastomeric repeating units and comprising crosslinkable ethylenically unsaturated moieties; and
   (d) unsaturated polyesters stabilized in vinyl monomers.

18. The improved composition of claim 12 further comprising a cure promoter or accelerator.

19. The curable adhesive composition of claim 1 further comprising a cure promoter or accelerator.

* * * * *